(12) United States Patent
Peterson

(10) Patent No.: US 6,349,960 B1
(45) Date of Patent: Feb. 26, 2002

(54) TOW LINE CONNECTOR

(75) Inventor: Leroy L. Peterson, Omaha, NE (US)

(73) Assignee: Sportsstuff, Inc., Omaha, NE (US)

( * ) Notice: Subject to any disclaimer, the term of this patent is extended or adjusted under 35 U.S.C. 154(b) by 0 days.

(21) Appl. No.: 09/574,196

(22) Filed: May 18, 2000

(51) Int. Cl.$^7$ .............................. B63B 7/08; B63B 21/06
(52) U.S. Cl. ........................ 280/480; 441/66; 114/253
(58) Field of Search ................................ 280/480, 481; 114/230.2, 242, 218, 253; D8/356; D12/316; 441/66, 65; 24/68 CD, 909, 265 AL

(56) References Cited

U.S. PATENT DOCUMENTS

| | | | | |
|---|---|---|---|---|
| 1,476,627 A | * | 12/1923 | Luebke et al. | |
| 2,494,526 A | * | 1/1950 | Tungett et al. | |
| 2,836,141 A | * | 5/1958 | Brydon | |
| 4,213,413 A | * | 7/1980 | Courtney | 114/253 |
| 4,270,478 A | * | 6/1981 | Kafka et al. | 114/218 |
| 4,354,445 A | * | 10/1982 | Kafka et al. | 114/218 |
| 4,807,554 A | * | 2/1989 | Chi-Hung | 114/345 |
| 4,945,849 A | * | 8/1990 | Morris et al. | 114/218 |
| 4,947,779 A | * | 8/1990 | Grinde | 114/250 |
| 5,009,183 A | * | 4/1991 | Naypaver | 114/253 |
| 5,564,670 A | * | 10/1996 | Dysarz | 248/515 |
| 5,702,278 A | * | 12/1997 | Boucher | 441/66 |
| 5,899,782 A | * | 5/1999 | Martin | 441/66 |
| 5,918,896 A | * | 7/1999 | Jenkins, Jr. | 280/457 |
| 6,217,401 B1 | * | 4/2001 | Peterson | 441/65 |

FOREIGN PATENT DOCUMENTS

GB 2211159 * 6/1989

* cited by examiner

*Primary Examiner*—Avraham H. Lerner
(74) *Attorney, Agent, or Firm*—Henderson & Sturm LLP

(57) ABSTRACT

A tow line connector including a base attached to a towable vehicle, a free end extending out from the base, an opening disposed between the base and the free end, and a pair of notches formed between the opening and the free end. A loop formed in a tow line is threaded through the opening, extended over the free end to engage the notches, and pulled taut to form a quick and easy connection of the tow line to the towable vehicle. In one embodiment, the base includes an attachment flange that is heat sealed to the towable vehicle, and in a second embodiment, the base includes a closed slot that receives a towing strap of a towable vehicle.

1 Claim, 1 Drawing Sheet

TOW LINE CONNECTOR

BACKGROUND OF THE INVENTION

1. Field of the Invention

The present invention relates to the field of vehicle towing accessories, and more particularly to a tow line connector adapted to be attached to a vehicle.

2. Description of Related Art

The prior art is replete with myriad and diverse towing accessories. While all of the aforementioned prior art constructions are more than adequate for the basic purpose and function for which they have been specifically designed, they are uniformly deficient with respect to their failure to provide a simple, efficient, and practical tow line connector for quickly and securely attaching a tow line to a vehicle.

As a consequence of the foregoing situation, there has existed a longstanding need for a new and improved tow line connector, and the provision of such a construction is a stated objective of the present invention.

BRIEF SUMMARY OF THE INVENTION

Briefly stated, the present invention provides a tow line connector including a base attached to a towable vehicle, a free end extending out from the base, an opening disposed between the base and the free end, and a pair of notches formed between the opening and the free end. A loop formed in a tow line is threaded through the opening, extended over the free end to engage the notches, and pulled taut to form a quick and easy connection of the tow line to the towable vehicle. In one embodiment, the base includes an attachment flange that is heat sealed to the towable vehicle, and in a second embodiment, the base includes a closed slot that receives a towing strap of a towable vehicle.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
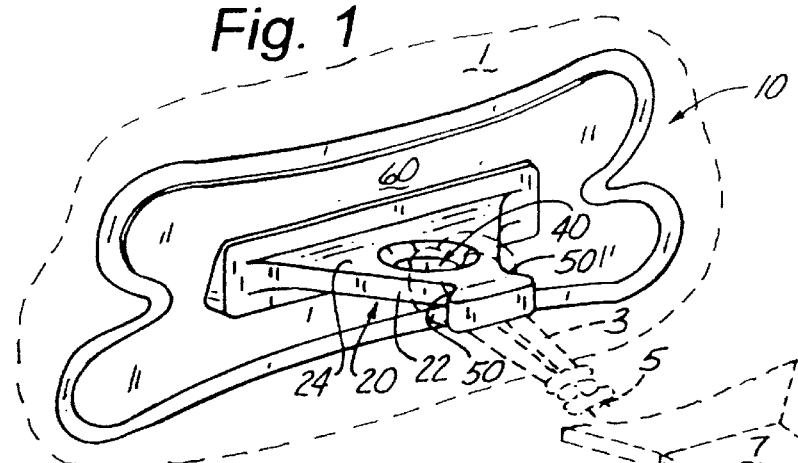
FIG. 1 is a perspective view of the tow line connector of the present invention illustrating it attached to a towable vehicle body, a portion of which is shown in dashed line.
Figure 2:
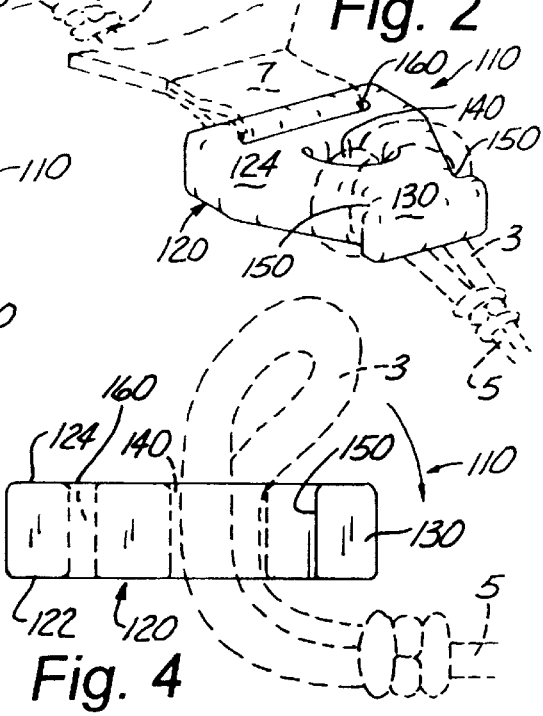
FIG. 2 is a perspective view of a second embodiment of the tow line connector illustrating it attached to a towing strap, a portion of which is shown in dashed line.
Figure 3:
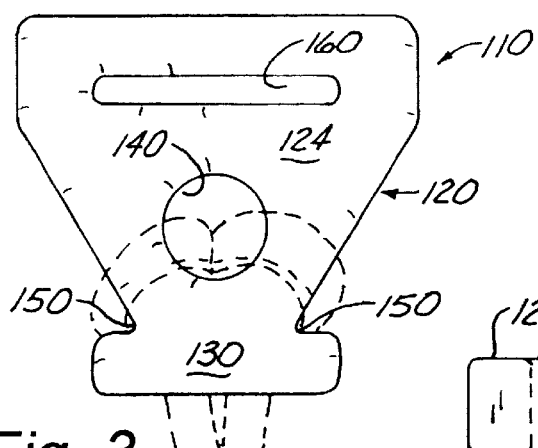
FIG. 3 is a top plan view of the second embodiment illustrating an attached tow line in dashed line.

As can be seen by reference to the drawings, and in particular to FIG. 1, the tow line connector that forms the basis of the present invention is designated generally by the reference number 10. The connector 10 includes a body member 20 having first and second sides 22, 24, a free end 30, an opening 40, a pair of laterally spaced notches 50, and an attachment flange 60. The flange 60 is attached to a portion of a towable vehicle 1 by heat sealing or other suitable means. A loop 3 in the end of a tow line 5 is threaded through the opening 40, extended over the free end 30 to engage the notches 50, and pulled taut (see FIGS. 4–6).

Figure 4:
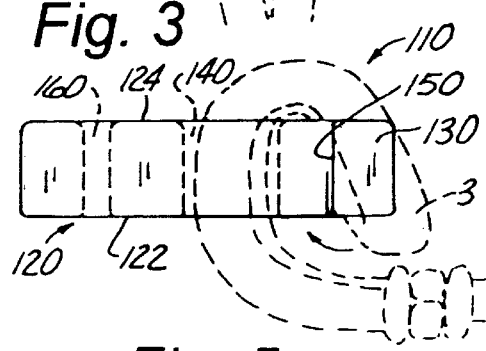
FIGS. 4–6 are a series of side elevational views illustrating the steps taken to quickly and securely attach a tow line to the connector.
Figure 5:
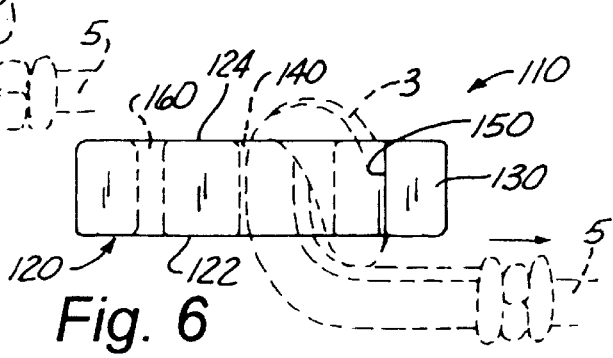
Figure 6:
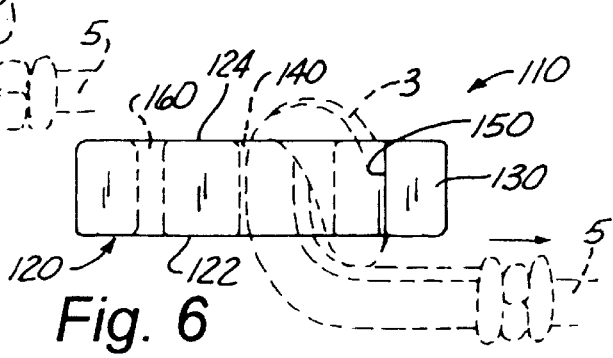

A second embodiment 110 shown in FIGS. 2–6 includes a body member 120 with first and second sides 122, 124, a free end 130, an opening 140, a pair of laterally spaced notches 150, and a closed slot 160. The closed slot receives a towing strap 7 which typically extends from the front of a towable vehicle 1. FIGS. 4–6 illustrate the method by which the tow line 5 is quickly and easily attached to the towable vehicle 1.

The tow line connector 10, 110 is specifically adapted for use with towable vehicles 1, such as inflatable water and snow vehicles. The connector 10, 110 provides a quick, easy, and secure attachment of a tow line 5 to a vehicle 1. The connectors 10, 110 may be made of any suitable material such as moldable plastics.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

What is claimed is:

1. A towable inflatable vehicle having a tow line connector, comprising:

a body member having a first side and a second side, the body member including a base operatively attached to said inflatable towable vehicle;

a free end extending out from the base;

an opening extending from the first side to the second side of the body member between the base and the free end, and a pair of laterally spaced notches disposed between the opening and the free end;

wherein the base includes an elongated closed slot extending from the first side to the second side of the body member parallel to the base, the slot being disposed to receive a towing strap attached to the inflatable towable vehicle.

* * * * *